Feb. 28, 1950  R. E. BLUE  2,498,873
BEARING AND METHOD OF MAKING THE SAME
Filed May 30, 1945
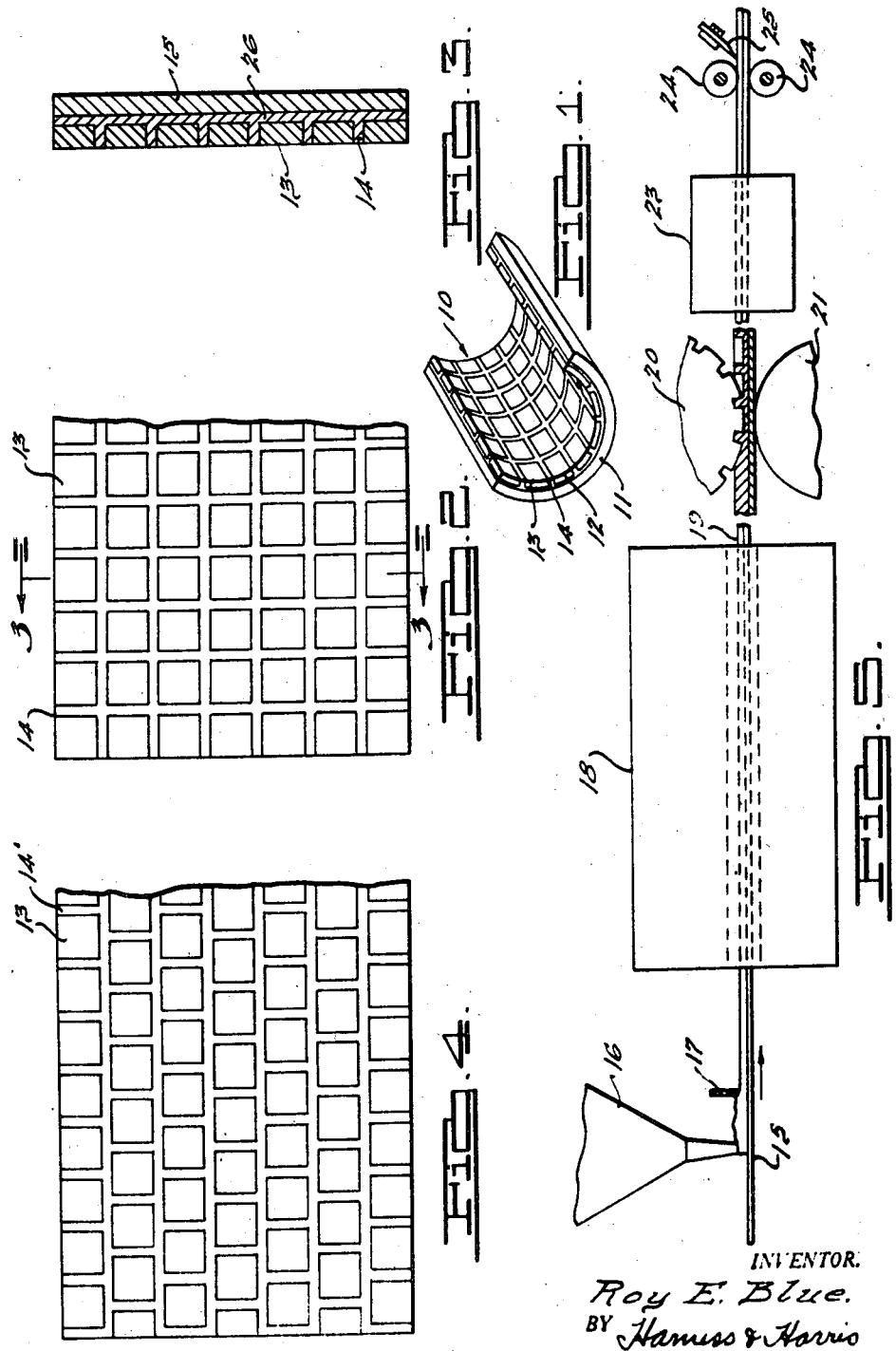
INVENTOR.
Roy E. Blue.
BY Harness & Harris
ATTORNEYS.

Patented Feb. 28, 1950

2,498,873

UNITED STATES PATENT OFFICE 2,498,873

BEARING AND METHOD OF MAKING THE SAME

Roy E. Blue, Detroit, Mich., assignor to Chrysler Corporation, Highland Park, Mich., a corporation of Delaware Application May 30, 1945, Serial No. 596,740

4 Claims. (Cl. 308—240)

1

This invention relates to improvements in bearings and the method of making the same.

More particularly, the invention relates to a bearing which includes a backing, an indented porous metal layer bonded to the backing and having the indentations filled with a bearing metal or metals.

An object of the invention is the making of a bearing characterized by improvements in load carrying ability, fatigue resistance, and operational life.

More particularly, objects of the invention are the provision of a grid type bearing in which a bearing metal or alloy is firmly anchored to a foundation or base therefor, and preferably to provide a foundation having pores into which the bearing metal flows to thereby form an interlock with the foundation; to provide a bearing having a bearing surface, selected portions of which are provided by the bearing metal and other portions thereof are provided by the foundation or base, the latter serving to arrest the extension of cracks originating in the surface provided by the bearing metal; and to provide a bearing in which the porosity of that portion of the bearing surface provided by the foundation is substantially reduced incident to application of the bearing metal to the base.

Other objects and advantages of the invention will be more apparent from the following description taken in connection with the accompanying drawings, in which:

Fig. 1 is a perspective view of a typical bearing section embodying the invention;

Fig. 2 is an enlarged fragmentary plan view of a stock strip from which the bearing of Fig. 1 is formed;

Fig. 3 is a sectional view taken on line 3—3 of Fig. 2;

Fig. 4 is a view similar to Fig. 3 but illustrating a modified form of the stock strip; and Fig. 5 is a diagrammatic view illustrating a method of forming the strip stock.

The bearing, generally designated by the numeral 10, shown in Fig. 1 includes a backing 11, and a layer of porous metal 12 bonded thereto having indentations each filled with a bearing metal as at 13. The indentations have a depth less than the thickness of the layer 12 and a wall 14 of the latter separates adjacent of these indentations.

Bearings of the heavy duty type, for example those used as main bearings and connecting rod bearings for internal combustion engines, should possess certain desirable characterizations for good performance. Among these characteristics are high fatigue resistance and compressive strength in conjunction with a wall thickness which will not unduly limit application of the bearing due to lack of clearance, yet which is sufficient to provide the desired compressive strength and fatigue resistance. Additionally, the bearing should be sufficiently soft to be compatible with the associated surface, to exhibit a reluctance to alloy therewith, and to permit particles of grit and metal to embed therein, thus avoiding undue wear of the associated surface.

A bearing can be economically produced by a combination of different metals which, when brought into the relationship disclosed in Fig. 1, exhibits the foregoing desirable characteristics. As shown in Fig. 1, the major portion of the bearing surface is provided by a relatively soft bearing metal anchored to the layer 12 which in turn is bonded to the rigid back 11. As herein contemplated the semi-cylindrical bearing 10 is formed from strip stock which is produced as more fully hereinafter set forth, although it will be understood that a cylindrical bearing may be similarly produced if desired.

Referring to Fig. 5, a strip 15, such as steel, suitable for providing the backing 11 of the bearing is continuously moved under a hopper 16 for depositing thereon powdered metal particles, excess particles being removed by a scraper 17 to provide a layer of the desired thickness on the strip. The strip with the layer thereon then passes through a furnace 18 and is therein heated in a reducing atmosphere at a temperature and for a time sufficient to sinter the particles together to form a porous layer 19 and bond the latter to the strip. The assembly then passes between pressure rolls 20, 21, the former having projections which compress the layer 19 to provide therein a surface pattern having indentations 22, adjacent ones being separated by a wall 14 of the metal of the layer 19. Preferably the indentations 22 are of a depth less than the thickness of the layer 19. The assembly is then passed through a furnace 23 having a non-oxidizing atmosphere and in which the bearing metal 13 in molten form is flowed onto the layer 19 to fill the indentations 22 thereof with this metal. The assembly is then passed between a pair of levelling rolls 24 after which it is advanced to a skive 25 or other suitable tool to remove any excess of the metal 13.

The strip thus provided may be wound on a spool for storing purposes, if desired, and thereafter stock of the proper lineal dimension cut therefrom and suitably formed in any well known manner to the semi-cylindrical structure shown in Fig. 1. The stock so formed is then sized by broaching or other operation which brings the walls of the porous layer and the bearing metal to a common level to provide the bearing surface which includes alternate portions of the layer 19 and the metal 13.

The porous layer 19 forms a sponge-like matrix for carrying the bearing metal 13 and may be provided by a mixture of powdered copper and tin particles, in the order of 90% copper and 10% tin by volume, which mixture is sintered at a temperature of approximately 1570° F. to provide a bronze layer and bond the latter to the strip 15. If desired, a quantity of lead or a lead-indium alloy may be included in the foregoing mixture, the lead serving to soften the bronze and act as a lubricant at high operating temperatures. Indium, when so included, inhibits corrosion of the lead and serves to distribute the lead more evenly in the mixture. As a further example, the layer 19 may be provided by a mixture of iron and copper particles in the order of 90% iron and 10% copper by volume which mixture is sintered at a temperature of approximately 2100° F., or such layer may be formed by copper particles sintered at a temperature of 1850° F.

The indentation pattern created by passing the strip between the rolls 20, 21 may be varied, one such variation being shown in Fig. 4, and it is to be understood that the invention is not to be limited to any particular design inasmuch as one feature of the invention is the provision of a multiplicity of indentations adjacent ones of which are separated by a wall.

The bearing metal 13 is preferably babbitt although other soft metals having good bearing characteristics may be employed. Instead of casting the bearing metal onto the strip, the same may be applied by depositing the metal in suitable quantity onto the strip and then heating to a flowing state. The bearing metal 13 has a lower melting point than the metal of the layer 19.

In order that use of the bearing may not be limited by reason of the wall thickness thereof, the porous layer 19 may, after sintering, be of a thickness in the range of 10 to 20 thousandths of an inch and a porosity of approximately 40% due to the presence of voids. After indentation, by passing between the rolls 20, 21, the portions of the layer 19 forming the walls 14 will have the original porosity while the bottom wall indicated at 26 in Fig. 3 will have a lesser porosity, in the approximate range of 10 to 15 per cent, due to compacting during the indenting operation. When the bearing metal 13 is in a molten state some thereof will enter the pores of the walls 14 at the sides of each indentation and the bottom wall 26 to firmly anchor the metal to the porous layer. Furthermore, by extending the indentations to a depth less than the thickness of the porous layer, the latter has sufficient surface contact with the backing strip to firmly anchor the same thereto and thus improve the fatigue resistance characteristics of the bearing. The bearing metal will enter the open pores at the top face of each wall 14 and thus reduce the initial porosity of this portion of the bearing surface.

Bearings made according to the foregoing method not only provide firm anchorage for the bearing metal, but the respective proportions of the bearing surface provided by the bearing metal and the intermediate layer may be predetermined and readily varied within limits.

Although but several specific embodiments of the invention have herein been shown and described, it will be understood that various changes in the size, shape and arrangement of parts may be made without departing from the spirit of the invention.

I claim:

1. The method of making a composite bearing which comprises the steps of depositing a layer of powdered metal on a reinforcing backing, heating said backing and powdered metal to a temperature sufficient to cause the particles to sinter together to form a porous layer bonded to said backing, forming a plurality of indentations in said porous layer spaced one from the other by a continuous wall of the porous layer, simultaneously filling said indentations and impregnating said walls at the top face thereof with a molten bearing metal having a melting point lower than the metal of said porous layer, and thereafter so bringing a surface of said bearing metal and said impregnated porous layer wall to a common level as to form thereat a composite bearing surface, areas of which are respectively provided solely by said impregnated walls and by said bearing metal.

2. A bearing including a metallic backing, a layer of sintered porous metal having opposite faces one thereof bonded to said backing, said layer including a multiplicity of indentations each open at the other of said faces and having side walls and a bottom wall, and a metallic bearing material filling said indentations and anchored to said walls, adjacent indentations being separated by a side wall of said layer, each side wall having a top face impregnated with said bearing material, said impregnated top faces and said bearing metal respectively constituting portions of the bearing surface for said bearing.

3. A bearing comprising a porous metallic matrix consisting of metallic particles sintered together, said matrix including a plurality of indentations open at one face of the matrix and having a depth less than the thickness of the matrix, and a bearing material filling said indentations, adjacent of said indentations being separated by a wall of said matrix having a top face impregnated with said bearing material, said impregnated faces and said bearing material being disposed at a common level such as to respectively provide selected portions of the area of the bearing surface of said bearing.

4. The method of making a composite bearing including a sintered porous metallic layer which comprises pressing said layer to form a plurality of indentations each having a depth less than the thickness of said layer and spaced one from another by a wall of said layer having a top face, simultaneously filling said indentations and impregnating said wall at said top face with a molten bearing metal, and thereafter so bringing a surface of said bearing metal and a surface of said top walls to a common level as to thereby provide a bearing surface, areas of which are respectively constituted by said impregnated walls and by said bearing metal.

ROY E. BLUE.

REFERENCES CITED

The following references are of record in the file of this patent:

UNITED STATES PATENTS

| Number | Name | Date |
|---|---|---|
| 335,047 | Torrey | Jan. 26, 1886 |
| 497,210 | Randall | May 9, 1893 |
| 1,603,470 | Johnson | Oct. 19, 1926 |
| 1,637,317 | Shoemaker | July 26, 1927 |
| 1,936,389 | Wadsworth | Oct. 12, 1939 |
| 2,190,237 | Koehring | Feb. 13, 1940 |
| 2,241,095 | Marvin | May 6, 1941 |
| 2,266,319 | Hobbs | Dec. 16, 1941 |
| 2,332,746 | Olt | Oct. 26, 1943 |

FOREIGN PATENTS

| Number | Country | Date |
|---|---|---|
| 536,414 | Great Britain | May 14, 1941 |